(12) United States Patent
Subbiah

(10) Patent No.: US 7,089,424 B1
(45) Date of Patent: Aug. 8, 2006

(54) PERIPHERAL DEVICE FOR PROTECTING DATA STORED ON HOST DEVICE AND METHOD AND SYSTEM USING THE SAME

(75) Inventor: Barani Subbiah, Sunnyvale, CA (US)

(73) Assignee: 3Com Corporation, Marlborough, MA (US)

( * ) Notice: Subject to any disclaimer, the term of this patent is extended or adjusted under 35 U.S.C. 154(b) by 840 days.

(21) Appl. No.: 10/144,273

(22) Filed: May 10, 2002

(51) Int. Cl.
*H04L 9/32* (2006.01)
*H04L 9/00* (2006.01)
*G06F 17/00* (2006.01)

(52) U.S. Cl. .......................... 713/189; 713/193; 726/1; 726/11; 380/278

(58) Field of Classification Search ........ 380/277–278; 713/150, 168, 171–172, 185–186, 192–194; 726/1, 11
See application file for complete search history.

(56) References Cited

U.S. PATENT DOCUMENTS 6,449,721 B1 * 9/2002 Pensak et al. .............. 713/171
6,954,753 B1 * 10/2005 Jeran ........................... 707/10

* cited by examiner

*Primary Examiner*—Hosuk Song

(57) ABSTRACT

A system for protecting data stored on a device. The system has a server for assigning encryption/decryption keys and one or more peripheral devices. The peripheral devices have a network interface to connect to the server to receive the keys, a host interface to couple to host devices, and an encryption/decryption engine for processing files transferred between the host devices and the peripheral devices. In this fashion, the peripheral devices use the keys to encrypt and decrypt data stored on the host devices.

22 Claims, 5 Drawing Sheets

PERIPHERAL DEVICE FOR PROTECTING DATA STORED ON HOST DEVICE AND METHOD AND SYSTEM USING THE SAME

TECHNICAL FIELD

The present invention generally pertains to the field of data protection. More particularly, embodiments of the present invention are related to a system and method using a peripheral device to encrypt sensitive data stored on a hard drive of a host computer.

BACKGROUND ART

Today it is very common for users to access a secure network via a portable electronic device, such as a laptop or a personal digital assistant (PDA). Such secure networks protect data as it is being transferred to and from the portable electronic device by such methods such as firewalls, virtual private networks (VPNs), and the like. For example, one traditional method to protect a corporate network is a firewall at the perimeter of the network.

However, such protection is only effective if the computing device stays behind the firewall. If the laptop or PDA is stolen then whatever files are on the user's computing device are vulnerable to theft as well. The computing device may be vulnerable even if the computing device is not stolen. For example, if it is taken home, the laptop or PDA will not be sitting behind the corporate perimeter firewall. Thus, any files that the user downloaded to the computing device are vulnerable. For example, if the user is connected to an un-secure network from home, a hacker may gain access to confidential files stored on the laptop.

Some additional measure of protection may be achieved via a software-implemented firewall. While a software firewall may operate even if the computing device is physically remote from the perimeter firewall protected network, the software firewall is susceptible to attacks from Trojan programs and other hacking methods. For example, the data may flow from a network interface card to a host device's operating system software stack where the software firewall performs its rule checks to determine whether the data should proceed further up the software stack. (And for outbound data the software firewall again resides at a point well above the network interface). Numerous examples have been reported in which such software firewalls have been compromised. For example, encryption keys may be passed though the system software stack where a hacker may easily hide and monitor.

Thus, a need has arisen for a way to protect data downloaded to a computing device from a secure network. A further need exists to protect such data if the computing device is stolen. An even further need exists to protect data on a computing device under attack when connected to an un-secure network. A still further need exists for a solution that is not easily defeated by hacking techniques such as Trojan programs.

SUMMARY

Embodiments of the present invention protect data downloaded to a host device from a secure network. Embodiments of the present invention protect data on a host device if it is stolen. Embodiments of the present invention protect data on a host device under attack when connected to an un-secure network. Embodiments of the present invention provide a solution that is not easily defeated by hacking techniques such as Trojan programs.

A method, system, and device for providing security in a computing network are disclosed. One embodiment provides a peripheral device for encrypting/decrypting data. The peripheral device comprises an encryption/decryption engine, logic for securely storing an electronic key, a network interface for receiving the electronic key, and a host interface for connecting to a host device. The peripheral device is operable to transfer a file from the host device to the peripheral device, process it with the encryption/decryption engine using the electronic key, and return the file to the host device.

Another embodiment provides for a system for protecting data stored on a computing device. The system comprises a server for assigning encryption/decryption keys and one or more peripheral devices. The peripheral devices have a network interface to connect to the server to receive the keys, a host interface to couple to host devices, and an encryption/decryption engine for processing files transferred between the host devices and the peripheral devices. In this fashion, the peripheral devices use the keys to encrypt and decrypt data stored on the host devices.

Yet another embodiment provides for a method of protecting data stored on a device with access to a secure network. The method involves a peripheral device obtaining a key from an external source, reading data onto the peripheral device from a host device, encrypting the data on the peripheral device with the key, and transferring the data back to the host device. Note that the external source can be a server that also distributes policies for a hardware embedded firewall residing on the peripheral device. The method can include the peripheral device receiving policies from the server for the hardware implemented firewall.

These and other advantages of the present invention will no doubt become obvious to those of ordinary skill in the art after having read the following detailed description of the preferred embodiments which are illustrated in the various drawing figures.

BEST MODE FOR CARRYING OUT THE INVENTION

Figure 1:
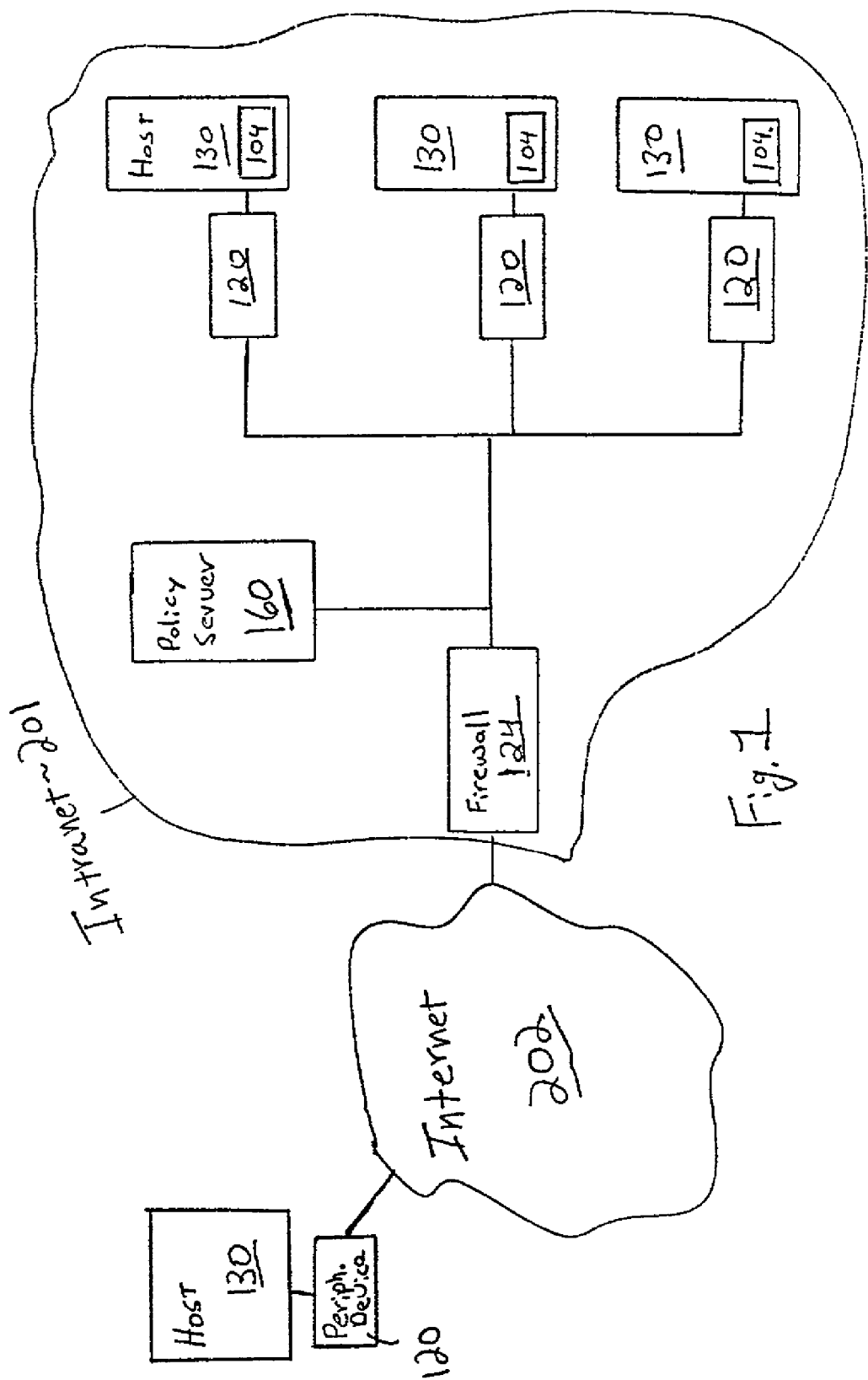
FIG. 1 is a diagram of a system comprising a secure network, according to embodiments of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "measuring", "calculating", "receiving", "computing" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

FIG. 1 illustrates a centrally managed system in which embodiments of the present invention may be practiced. The host devices 130 (e.g., personal computer, laptop, personal digital assistant, etc.) may be a part of a corporate Intranet 201. During normal operation, any of the host devices 130 may download sensitive or confidential information from a server or another host device 130 in the Intranet 201 and store them on a hard drive 104. The perimeter firewall 124 provides protection from attacks from outside the Intranet 201, for example, from the Internet 202. Also, the peripheral devices 120 may provide an embedded firewall for added protection. However, sometimes a host device 130 is unprotected by the perimeter firewall 124 (e.g., the host device 130 on the left of FIG. 1). This may be a user who has taken home a laptop, a PDA, or other portable electronic device. It may also be that an employee's portable computing device is stolen. The present invention is also applicable to a computing device that is not portable, for example, a user's home personal computer.

Embodiments of the present invention protect files that are stored on a host device 130 by using a peripheral device 120, such as, for example, a network interface card (NIC) to encrypt sensitive files that are stored on a hard drive 104 of the host device 130. Because the peripheral device 120 is a separate entity from the host device 130, the peripheral device 120 is not compromised even if the host device 130 is compromised.

The policy server 160 may store policies to be transferred to peripheral device 120 and implemented by a firewall in the peripheral device 120. The policy server 160 may be administered by an administrator console (not shown) that defines firewall rules.

Figure 2:
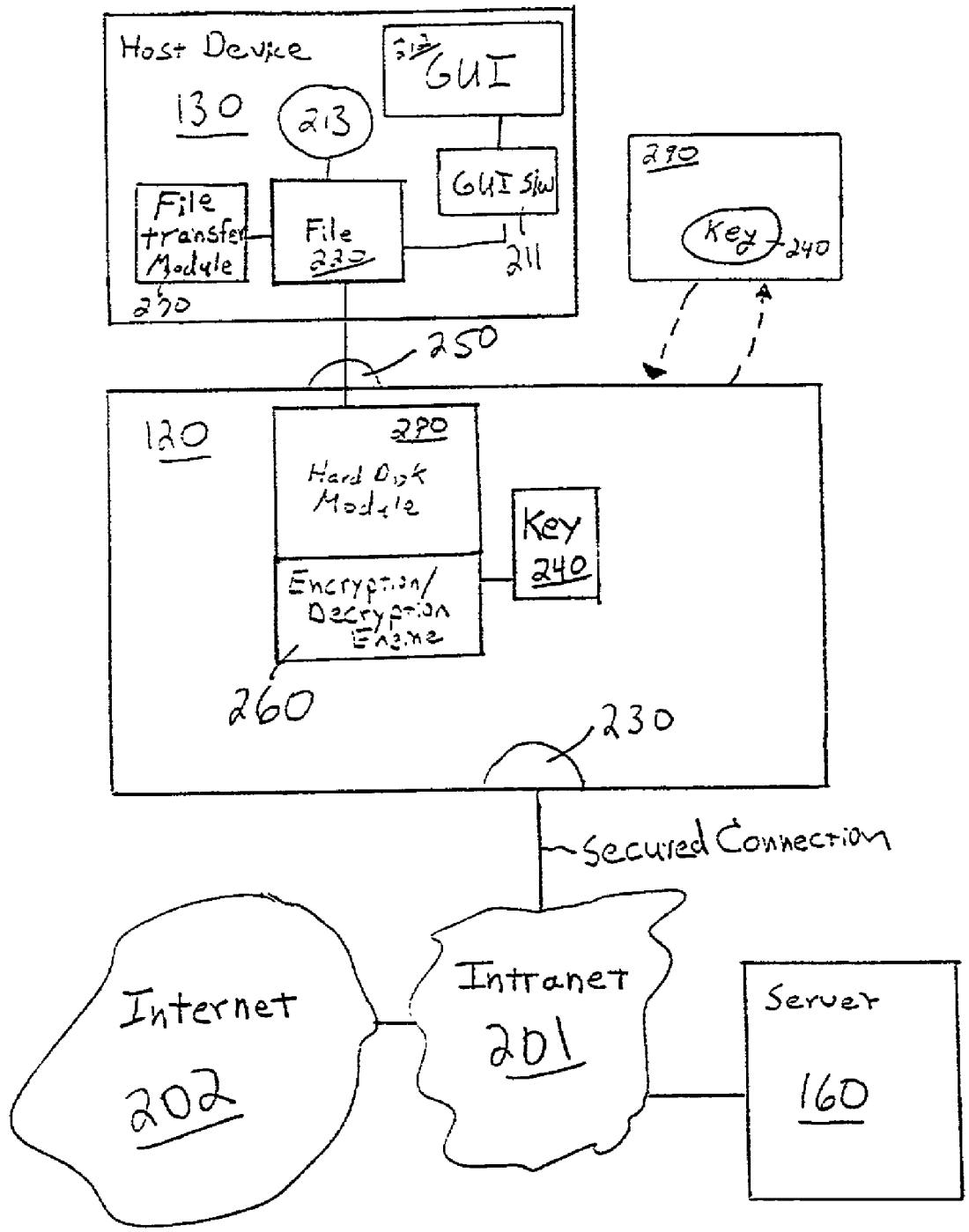
FIG. 2 is a diagram of a system having a peripheral device for protecting data stored on a host device, according to embodiments of the present invention.

FIG. 2 illustrates a system for protecting data stored on a host device 130. The data may be a file 220 that the host device 130 (e.g., personal computer, laptop, personal digital assistant, etc.) downloaded via a secured connection or a file modified while connected. However, the present invention may protect any data stored on the host device 130 (e.g., on a hard drive 104). The peripheral device 120 may have a network interface 230, which may be used when connecting to the policy server 160 to obtain one or more keys 240 for encryption and decryption. The connection may include, e.g., Ethernet, wireless local area networks (WLAN), modem, Bluetooth®, and Virtual Private Networks (VPNs). The Intranet 201 may be a secure network, for example, a secure corporate computing environment. The host device 130 may also access the Internet 202, although it may be behind a firewall.

The file 220 may initially be stored un-encrypted on the host device 130. When the file 220 is to be encrypted, it is transferred to the peripheral device 120 via a host interface 250 and encrypted by the encryption/decryption engine 260 using the key 240. Then the file 220 is transferred back to the host device 130, where it may be stored in its original location. The host device 130 may have a file transfer module 270 and the peripheral device 120 may have a hard disk module 280 for assisting in the transfer process. After the file or files are encrypted, the key 240 may be erased from the peripheral device 120. In this fashion, if the host device 130 and peripheral device 120 are stolen, the encrypted data may not be read. Furthermore, the key 240 never enters the host device 130 and hence may not be stolen by software that a hacker malevolently placed on the host device 130. Additionally, the file transfer module 270 on the host device 130 does not understand the encryption/decryption method and never has access to the key 240.

The host device 130 may also contain graphical user interface (GUI) software 211 for displaying a graphical user interface 212 that may prompt the user to select a file 220 to be encrypted. The host device 130 may also contain software 213 that determines that a file is a candidate for encryption, for example, that the file is confidential with respect to a secure network in which the host device 130 resides.

When the user wishes to access the encrypted file 220, it must be processed by the peripheral device 120. If the policy server 160 is available, the user connects thereto and obtains the key 240 via the secured connection. The user may be required to authenticate and the policy server 160 may store a copy of the key (or keys) 240 for each host device 130.

However, sometimes the user will not have access to the policy server 160. For example, the user may be sitting in an aircraft, at a coffee shop, etc. To provide for this case, the key 240 may be transferred to a key storage device 290 before it is erased from the peripheral device 120. The key storage device 290 may be, for example, a smartcard or a thumbprint reader. If the policy server 160 is unavailable, the user may transfer the key 240 back to decrypt the file 220. The user may also transfer the key 240 back to encrypt a file 220. Because the key storage device 290 requires a mechanism such as, for example, a thumbprint or secret code to "unlock" the key 240, the data on the host device 130 remains secure even if the key storage device 290 is stolen. The connection between the peripheral device 120 and key storage device 290 may be any suitable means, such as, for example, Infrared, cable, wireless, etc.

Figure 3:
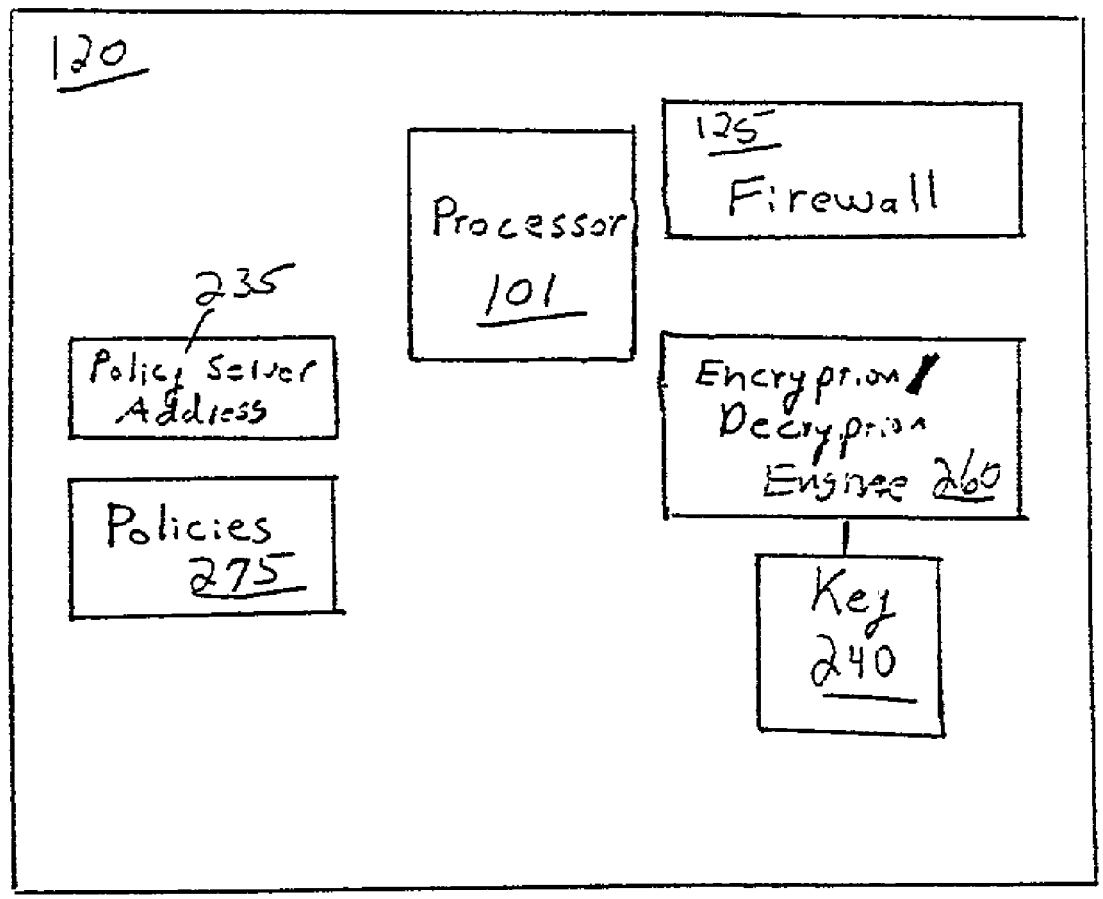
FIG. 3 is a diagram of a peripheral device for encrypting/decrypting data, according to embodiments of the present invention.

FIG. 3 illustrates a peripheral device 120, according to one embodiment of the present invention. The peripheral device 120 may be implemented on a device such as a PCMCIA card (Personal Computer Memory Card International Association card or PC card), although the present invention is not limited to such a card. The peripheral device 120 may store an address 235 of a policy server 160, which the peripheral device 120 may try to locate when a key 240 or policies are needed. Thus, the peripheral device 120 may store policies 275 consisting of various rules defining protocols it accepts or rejects, types of IP (Internet Protocol) addresses to which it is allowed to talk, etc. An administrator console may define these rules and provide them to a policy server 160, which gives them securely to the peripheral device 120.

The peripheral device 120 may receive updates to the policies 275 from the policy server 160. If the peripheral device 120 cannot find a policy server 160, then the peripheral device 120 may rely on fallback policies 275 that are stored on the peripheral device 120. Multiple fallback policies 275 may be stored. The peripheral device 120 has stored therein rules that are used to determine which policies 275 to use depending on the type of communication the communication interface device is using and/or location.

The peripheral device 120 may also contain a firewall 125, which implements the policies 275 when processing all data that flows through the peripheral device 120 that involves the network interface 230. Finally, the peripheral device 120 has its own processor 101 so that the host device 130 is not involved in the encryption/decryption or firewall processing.

Figure 4:
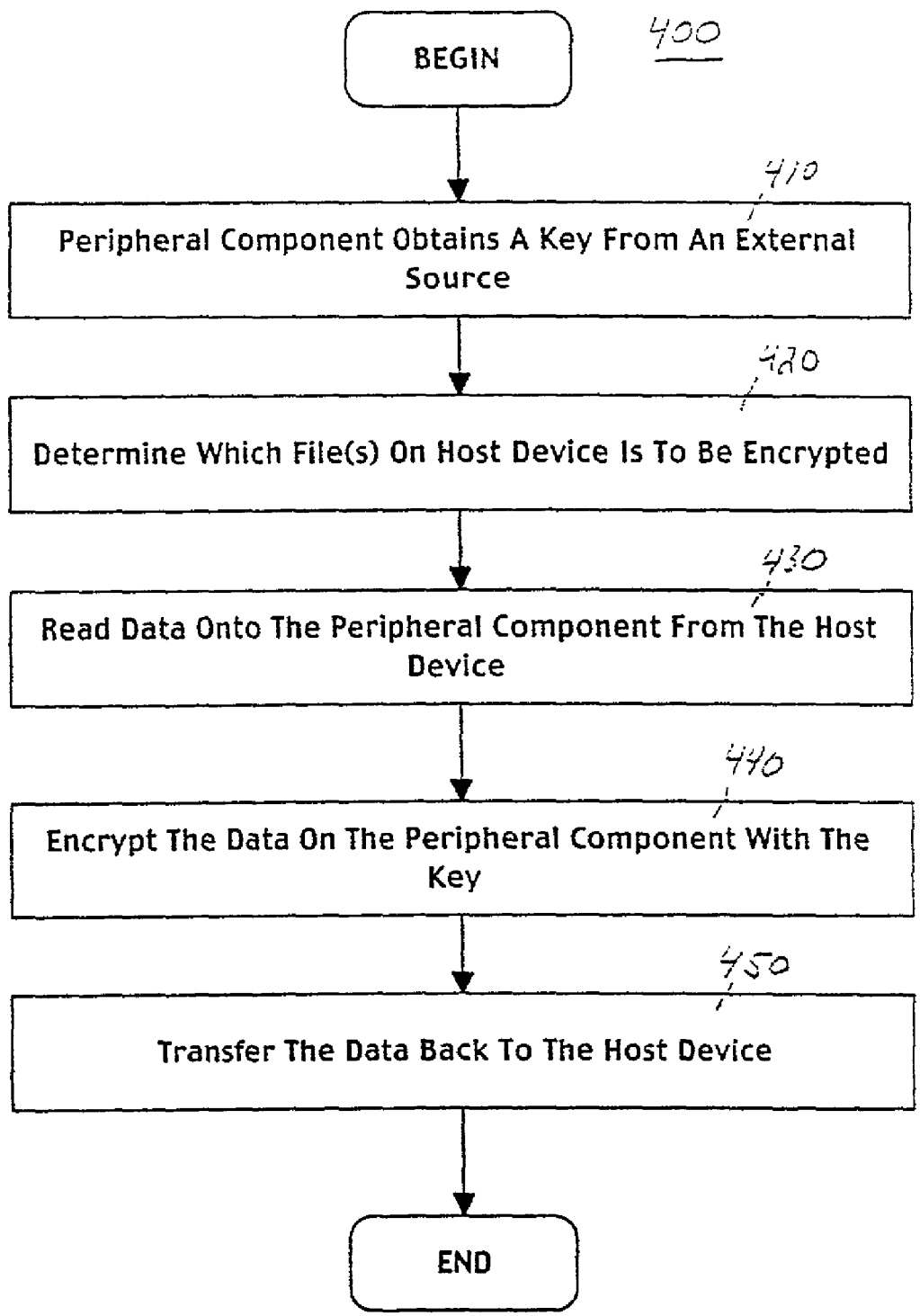
FIG. 4 is a flowchart illustrating steps of a process of protecting data stored on a host device using a peripheral device, according to embodiments of the present invention.

FIG. 4 illustrates a process 400 of protecting data stored on a host device 130 with access to a secure network. Steps of process 400 may be stored on a computer readable medium and executed on a general-purpose processor. Some steps may be performed on the peripheral device 120 and others on the host device 130. In step 410, a peripheral device 120 obtains a key 240 from an external source. The external source may be, for example, a policy server 130 or a key storage device 290, such as a smartcard or thumbprint reader. If the peripheral device 120 obtains the key 240 from a policy server 160, it may also obtain policy rules at this time from the policy server 160. Thus, the peripheral device 120 may also be used as a firewall. Note that the external source can be a server that also distributes policies for a hardware embedded firewall residing on the peripheral device 120.

In step 420, the process 400 determines which files 220 are to be encrypted. This may be performed by allowing the user to select file(s) 220. For example, a graphical user interface may be displayed on the host device 130. The display might contain all files identified as being confidential with respect to a system of which the host device 130 is a part (e.g., the corporate Intranet 201) or a subpart thereof. Any suitable means may be used to determine what files 220 are confidential or sensitive. The determination may occur at a variety of times, for example, the user may be prompted: each time an application running on the host device 130 is exited or a file 220 within the application is closed, whenever the host device 130 is shut down, whenever the secured connection is about to be closed, etc.

In step 430, the data is read onto the peripheral device 120 from the host device 130. This may be performed as a block by block copy from a hard drive 104 and may involve the software module 270 on the host device 130.

In step 440, the data is encrypted on the peripheral device 120 using the key 240. After the data has been encrypted, the key 240 may be destroyed so that the data remains protected even if the peripheral device 120 and host device 130 are stolen. For example, the key 240 may be erased from the peripheral device 120 when the connection on the secured network (e.g., Intranet 201) is terminated.

In step 450, the data is transferred back to host device 130. The data may be returned to its original location (e.g., hard drive 104) or sent to a requesting application on the host device 130. The process of decrypting a file 220 may involve: obtaining the key 240 as in step 410, transferring the encrypted file 220 to the peripheral device 120, decrypting with the key 240, and transferring back to the host device 130.

Periodically, the key 240 may be updated. For example, the peripheral device 120 may obtain the current key 240, decrypt all data encrypted with that key 240 on the host device 130, obtain and re-encrypt with a new key 240.

Figure 5:
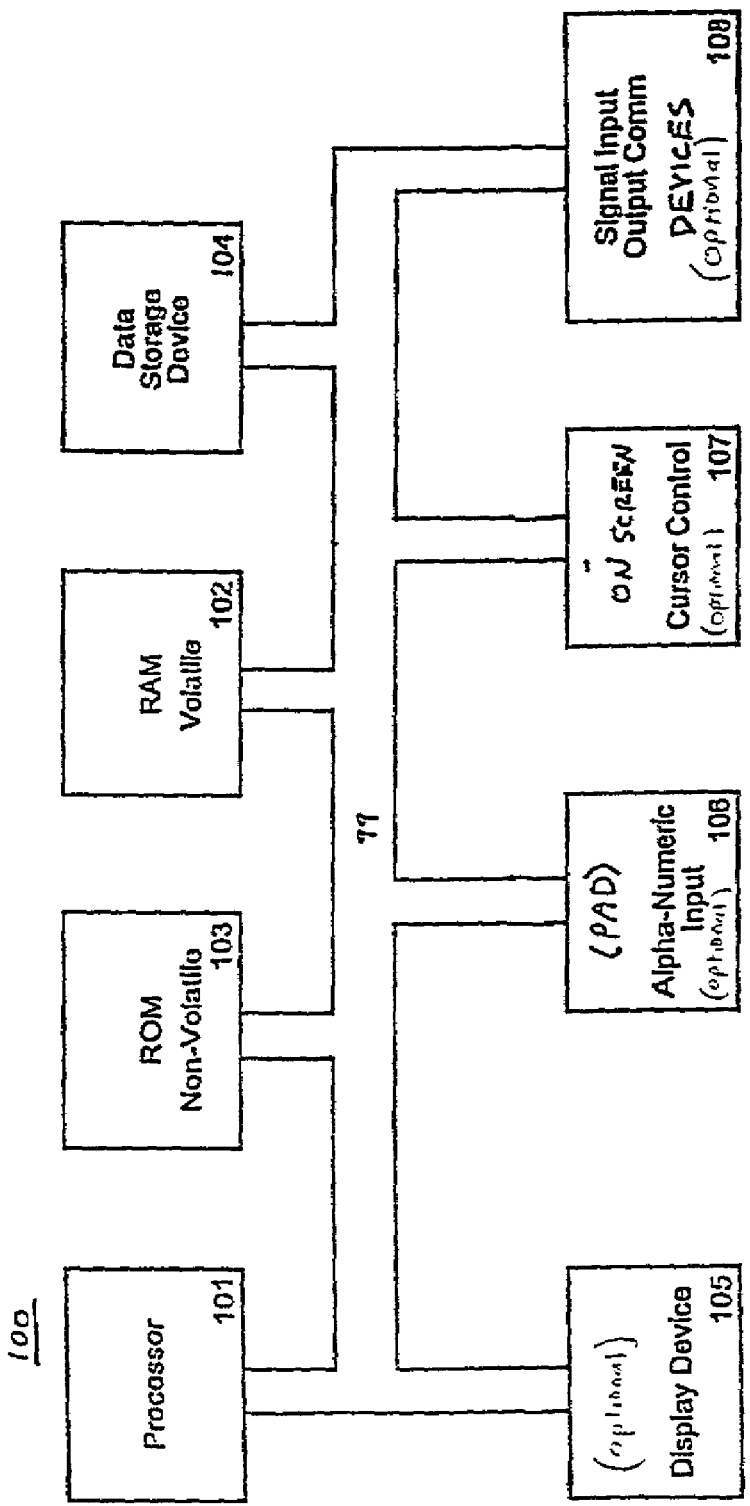
FIG. 5 is a schematic diagram of an exemplary computer system upon which embodiments of the present invention may be practiced.

With reference now to FIG. 5, portions of the present invention are comprised of computer-readable and computer-executable instructions which reside, for example, in computer-usable media of a computer system 100. For example, computer system 100 or portions thereof may be used as a platform for the host device 130 and the peripheral device 120. For example, the peripheral device 120 may have thereon a processor 101 and various memory units. FIG. 5 illustrates an exemplary computer system 100 used to perform a method in accordance with embodiments of the present invention. It is appreciated that system 100 of FIG. 5 is exemplary only in that the present invention can operate within a number of different computer systems including general purpose networked computer systems, embedded computer systems, and stand alone computer systems. Additionally, computer system 100 of FIG. 5 is well adapted to having computer readable media such as, for example, a floppy disk, a compact disc, and the like coupled thereto. Such computer readable media is not shown coupled to computer system 100 in FIG. 5 for purposes of clarity.

System 100 of FIG. 5 includes an address/data bus 99 for communicating information, and a central processor unit 101 coupled to bus 99 for processing information and instructions. Central processor unit 101 may be an 80×86-family microprocessor. System 100 also includes data storage features such as a computer usable volatile memory 102, e.g. random access memory (RAM), coupled to bus 99 for storing information and instructions for central processor unit 101, computer—usable non-volatile memory 103, e.g. read only memory (ROM), coupled to bus 99 for storing static information and instructions for the central processor unit 101, and a data storage unit 104 (e.g., a magnetic or optical disk and disk drive) coupled to bus 99 for storing information and instructions.

With reference still to FIG. 5, system 100 of the present invention also includes an optional alphanumeric input device 106 including alphanumeric and function keys is coupled to bus 99 for communicating information and command selections to central processor unit 101. System 100 also optionally includes a cursor control device 107 coupled to bus 99 for communicating user input information and command selections to central processor unit 101. System 100 of the present embodiment also includes an optional display device 105 coupled to bus 99 for displaying information. System 100 of the present embodiment may optionally include a signal input output communication device 108, which may control the flow of information between the bus 99 and a network (e.g., Internet 202 or Intranet 201).

Therefore, it will be seen that embodiments of the present invention provide for a system, method, and device to protect data downloaded to a host device from a secure network. Embodiments of the present invention protect data on a host device if it is stolen. Embodiments of the present invention protect data on a host device under attack when connected to an un-secure network. Embodiments of the present invention provide a solution that is not easily defeated by hacking techniques such as Trojan programs.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A system for protecting data stored on a device, said system comprising:
   a server for assigning an encryption/decryption key; and
   a peripheral device comprising:
      an embedded firewall:
      a network interface for connecting to said server to receive said key;
      a host interface for coupling to a host device; and
      an encryption/decryption engine for processing files transferred between said host device and said peripheral device, wherein said peripheral device uses said key to encrypt and decrypt data stored on said host device;
   wherein said server is further for distributing policies to said peripheral device for implementing said embedded firewall.

2. The system of claim 1, further comprising additional peripheral devices coupled to additional host devices;
   said additional peripheral devices for receiving keys from said server for encrypting and decrypting files on said additional host devices.

3. The system of claim 1, further comprising a device for securely storing said key external to said peripheral device, wherein said peripheral device obtains said key from said device if said server is unavailable to said peripheral device.

4. The system of claim 1, further comprising software on said host device for determining which files on said host device are to be encrypted, wherein said files are system confidential files.

5. The system of claim 4, further comprising software on said host device for displaying a graphical user interface to allow a user to select a file to be encrypted.

6. The system of claim 1, wherein said peripheral device is a Personal Computer Memory Card International Association (PCMCIA) card.

7. The system of claim 1, wherein said peripheral device further comprises a stored address to locate said server for delivering said key.

8. A method of protecting data stored on a device with access to a secure network, comprising:
   a) a peripheral device obtaining a key from a server that also distributes policies for a hardware embedded firewall residing on said peripheral device;
   b) reading data onto said peripheral device from a host device;
   c) encrypting said data on said peripheral device with said key;
   d) transferring said data back to said host device; and
   e) said peripheral device receiving policies from said server for said hardware implemented firewall.

9. The method of claim 8, further comprising:
   before said b), determining that a file on said external device is to be encrypted.

10. The method of claim 9, wherein said determination comprises prompting a user with a list of files to potentially be encrypted.

11. The method of claim 10, wherein said files are identified as being confidential with respect to a system, wherein said host device is a part of said system.

12. The method of claim 8, further comprising:
   transferring said key to a device for securely storing said key;
   erasing said key from said peripheral device;
   transferring said key from said device for securely storing said key to said peripheral device; and
   decrypting said file with said key.

13. The method of claim 12, wherein said device for securely storing said key is a smartcard.

14. The method of claim 12, wherein said device for securely storing said key is a thumbprint reader.

15. The method of claim 8, further comprising:
   transferring said key to a device for securely storing said key.

16. The method of claim 8, further comprising:
   erasing said key from said peripheral device.

17. A system for protecting data stored on a device, said system comprising:
   a server for assigning an encryption/decryption key;
   a peripheral device comprising:
      a network interface for connecting to said server to receive said key;
      a host interface for coupling to a host device; and
      an encryption/decryption engine for processing files transferred between said host device and said peripheral device, wherein said peripheral device uses said key to encrypt and decrypt data stored on said host device;
   software on said host device for determining which files on said host device are to be encrypted, wherein said files are system confidential files; and
   software on said host device for displaying a graphical user interface to allow a user to select a file to be encrypted.

18. The system of claim 17, further comprising additional peripheral devices coupled to additional host devices;
   said additional peripheral devices for receiving keys from said server for encrypting and decrypting files on said additional host devices.

19. The system of claim 17, wherein said peripheral device further comprises an embedded firewall.

20. The system of claim 19, wherein said server is further for distributing policies to said peripheral device for implementing said embedded firewall.

21. The system of claim 17, further comprising a device for securely storing said key external to said peripheral device, wherein said peripheral device obtains said key from said device if said server is unavailable to said peripheral device.

22. The system of claim 17, wherein said peripheral device further comprises a stored address to locate said server for delivering said key.

* * * * *